No. 816,696. PATENTED APR. 3, 1906.
W. B. WHITE.
MECHANISM FOR VEHICLE LANTERNS.
APPLICATION FILED FEB. 27, 1904.

WITNESSES:
S. T. Davies
G. W. Saywell

INVENTOR:
William B. White
by his attorney
J. D. Fay

UNITED STATES PATENT OFFICE.

WILLIAM B. WHITE, OF CLEVELAND, OHIO.

MECHANISM FOR VEHICLE-LANTERNS.

No. 818,696. Specification of Letters Patent. Patented April 3, 1906.

Application filed February 27, 1904. Serial No. 195,649.

*To all whom it may concern:*

Be it known that I, WILLIAM B. WHITE, a citizen of the United States, and a resident of Cleveland, county of Cuyahoga, and State of Ohio, have invented a new and useful Improvement in Mechanism for Vehicle-Lanterns, of which the following is a specification, the principle of the invention being herein explained and the best mode in which I have contemplated applying that principle so as to distinguish it from other inventions.

My invention relates to mechanism for actuating vehicle-lanterns so as to project their rays in different directions and concurrently with the change in angular position of the vehicle-wheels, so as to always illuminate that portion of the roadway ahead which it is desired to traverse.

The said invention consists of means hereinafter described, and particularly set forth in the claims.

The annexed drawings and the following description set forth in detail certain mechanism embodying the invention, such disclosed means constituting but one of various mechanical forms in which the principle of the invention may be used.

Figure 1:
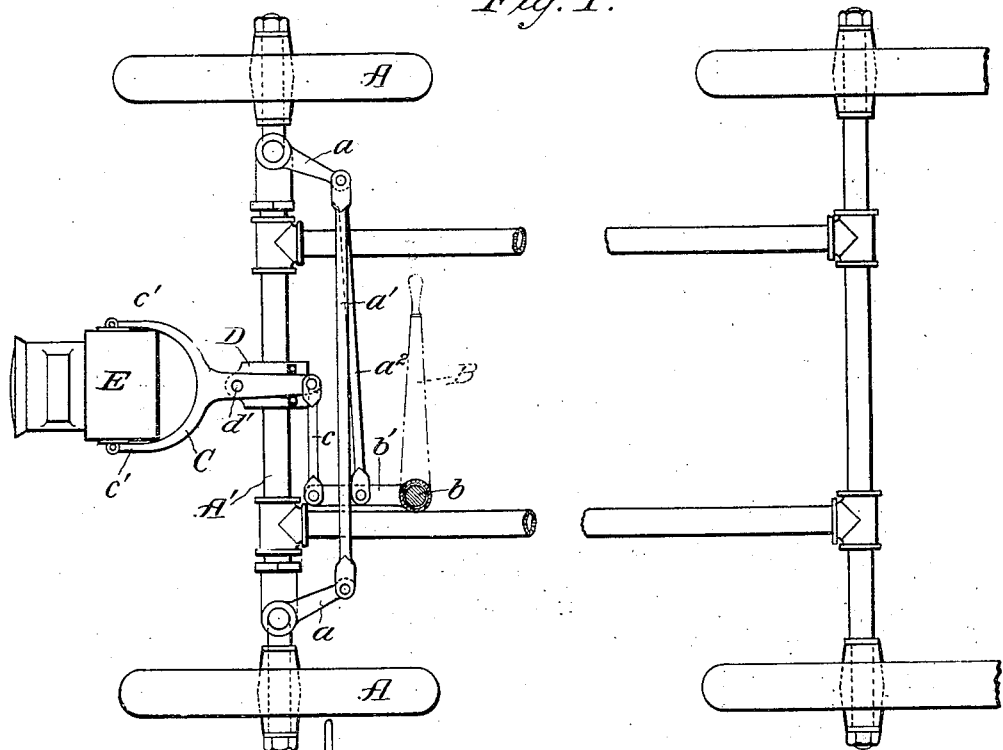
Figure 2:
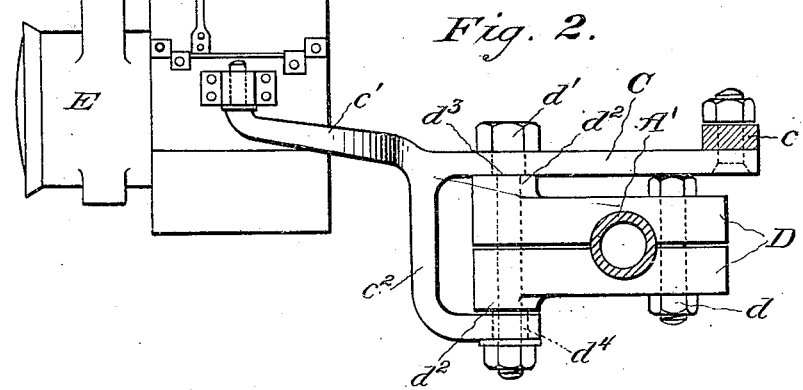

Figure 1 represents a broken plan view of the running-gear of an automobile with a lantern and actuating mechanism therefor embodying my invention. Fig. 2 represents an enlarged side elevation of a lantern and connected parts attached to the front axle of the vehicle.

The front or steering wheels A of the automobile are pivoted in the usual manner and are capable of angular variation through the medium of a steering-lever B and post $b$, mounted in the usual manner upon the vehicle, two bell-crank arms $a\ a$, connected by means of a link $a'$ and connected, respectively, at their front ends to suitable stub-axles, upon which the front wheels A turn, one of such arms being connected with a second link $a^3$, attached to a bell-crank arm $b'$, secured to the bottom of the steering-post $b$, as will be readily understood and observed in Fig. 1.

The bell-crank arm $b'$ is extended forwardly, and pivotally connected with its extremity is a link $c$, whose other end is pivotally connected with a lamp-bracket C. The said bracket is provided with two arms $c'\ c'$, which suitably support the lantern E. Upon the middle of the axle A' is secured a support D, as shown in Fig. 2, consisting of two members—an upper and a lower. A bolt and nut $d$ secures the rear ends of these support members, and a bolt and nut $d'$ secures the front ends of these members. Such front ends are provided with bosses $d^2$, which form a bearing for the lamp-bracket, the latter being provided with a downwardly and inwardly extending arm $c^2$. The upper portion of the bracket and the inner end of the arm $c^2$ are provided with alined openings through which the bolt $d'$ extends. The bolt $d'$ hence forms a pivotal axis for the lamp-bracket, whereby the latter may be swung in a horizontal plane and its angular position hence varied. The upper portion of the bolt is provided with a shoulder $d^3$, and a bushing $d^4$ is interposed between the nut and the lower member of the support D, so that the bolt may be tightened without binding the bracket upon its bearings. It will therefore be seen that the above construction causes the lamp-bracket, and hence the lamp, to vary its angularity concurrently with the variation of the angularity of the steering-wheels A A, so that the lantern's rays will always be cast or projected ahead of the vehicle and upon that portion of the roadway which it is desired to traverse.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention—

1. The combination of vehicle-wheels, manually-operated means for changing the angularity of the same, a lantern-bracket connected with said means, a support for said bracket carried by the vehicle-body and fixed relatively to the same, said bracket embracing said support on two sides and connected to the same by a pivotal bolt, whereby the angularity of said wheels and said bracket may be varied concurrently.

2. The combination with the vehicle-wheels and a steering-lever of a motor-vehicle; of a lantern-bracket pivotally mounted upon the vehicle-body; a bell-crank connected with said steering-lever; link connections between said bell-crank and said vehicle-wheels; and other link connections between said bell-crank and said lantern-bracket.

3. The combination with the front axle, the front wheels, suitable stub-axles for the latter, and the steering-lever of a motor-vehicle; of two bell-cranks connected respectively at their front ends to said stub-axles; a link connecting the rear ends of said bell-cranks; a lantern-bracket pivotally mounted upon the vehicle-body; link connections between said lantern-bracket and the steering-lever; and a link connecting said link connections and the rear end of one of said bell-cranks.

Signed by me this 26th day of February, 1904.

WILLIAM B. WHITE.

Attest:
G. W. SAYWELL,
A. E. MERKEL.